June 13, 1939. H. E. BRANDT ET AL 2,162,057
KNAPSACK SPRAYER
Filed Aug. 7, 1937  2 Sheets-Sheet 1

Inventors
HENRY E. BRANDT
CLIFFORD ZWICKEY
By Chas. C. Reyf.
Attorney

Inventors
HENRY E. BRANDT
CLIFFORD ZWICKEY
By Chas. C. Reif
Attorney

Patented June 13, 1939

2,162,057

UNITED STATES PATENT OFFICE 2,162,057

KNAPSACK SPRAYER

Henry E. Brandt and Clifford Zwickey, St. Paul, Minn., assignors to Dobbins Manufacturing Company, St. Paul, Minn., a corporation of Minnesota Application August 7, 1937, Serial No. 157,942

1 Claim. (Cl. 299—97)

This invention relates to a sprayer for spraying insecticides and other liquid. While the features of the invention may have many applications, in the embodiment of the invention illustrated, the sprayer is shown of the type adapted to be carried on the back of the operator, the same having a discharge means arranged to be held in one hand of the operator and an operating handle arranged to be operated by the other hand of the operator. A sprayer of said general type has been previously used but such sprayers have commonly been equipped with an operating handle disposed only at one side thereof. This made it necessary for the operator always to use the same hand for operating the handle, which handle actuates the spray discharge means. It is desirable to have a sprayer in which the handle may be disposed at either side thereof so that the operator may operate the handle with either hand if desired and so that the sprayer is adapted for convenient use by a left handed operator.

It is an object of this invention therefore, to provide a sprayer of the type having a tank carried on the back of the operator comprising an operating handle which may be disposed at either side of said tank.

It is a further object of the invention to provide a sprayer of said type having an outlet for the sprayed material at either side of the tank and a discharge member which may be connected to either of said outlets.

It is another object of the invention to provide such a sprayer having a container for a liquid within said tank, a pump for pumping liquid into said container, and a novel and efficient mechanism for operating said pump.

It is still another object of the invention to provide such a sprayer comprising a casing having a plate or diaphragm extending thereacross some distance above its bottom to form a tank thereabove and having a pump and operating mechanism therefore disposed below said plate or diaphragm within said casing and a removable cover for the bottom of said casing.

It is a further object of the invention to provide a sprayer having a tank adapted to be carried on the back of the operator and discharge means including a rigid tube and a holding means for said tube on the rear of said tank so arranged that the operator may place the tube in said holder while the tank is carried on his back.

These and other objects and advantages of the invention will be fully set forth in the following description made in connection with the accompanying drawings in which like reference characters refer to similar parts throughout the several views and in which.

Figure 1:
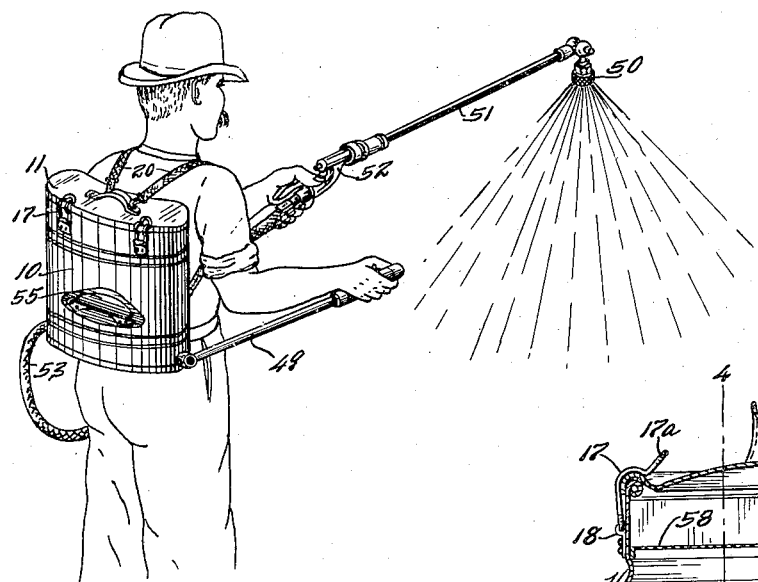
Fig. 1 is a perspective view showing the sprayer in operation as carried by the operator.
Figure 2:
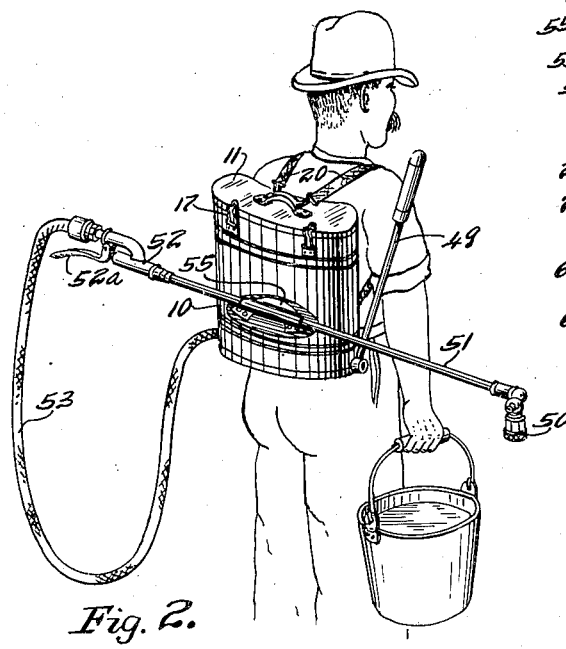
Fig. 2 is a similar view showing the spray discharge tube held in the holder of the tank.
Figure 3:
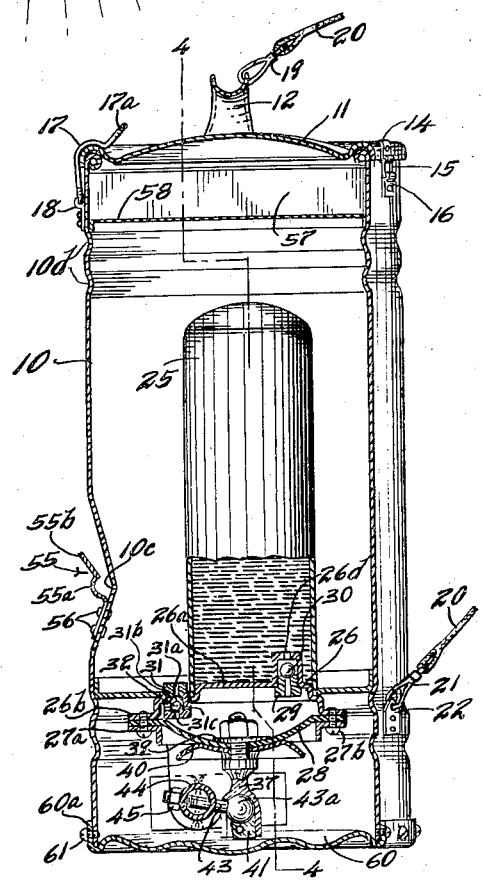
Fig. 3 is a vertical section taken on line 3—3 of Fig. 4 as indicated by the arrows.
Figure 4:
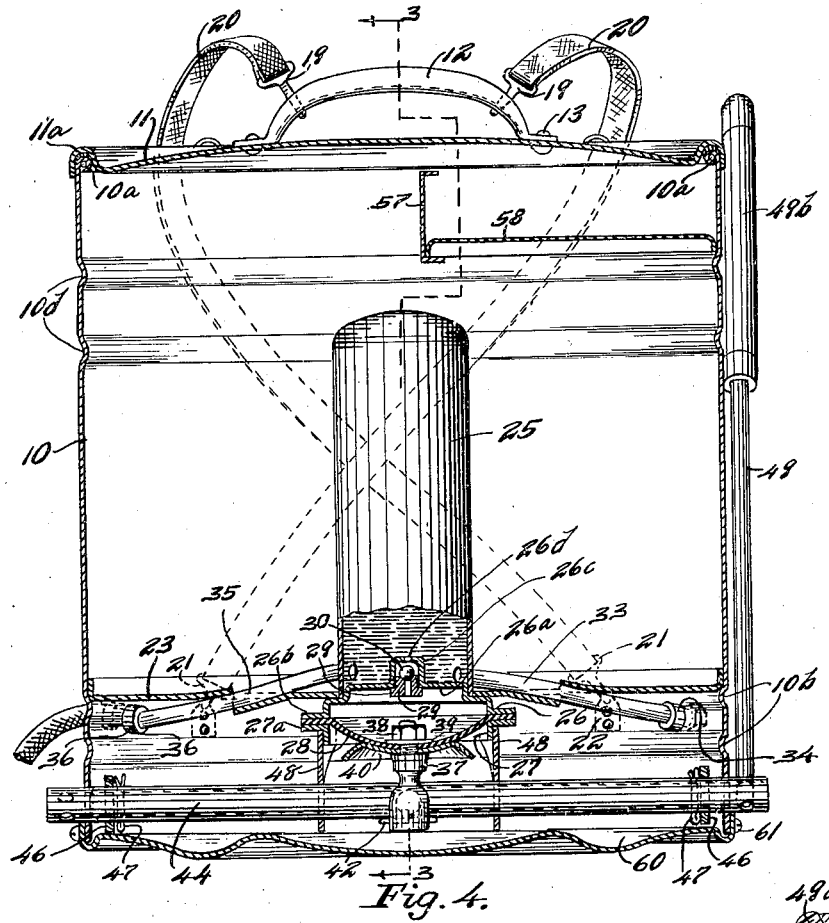
Fig. 4 is a vertical section taken substantially on line 4—4 of Fig. 3.
Figures 5, 6:
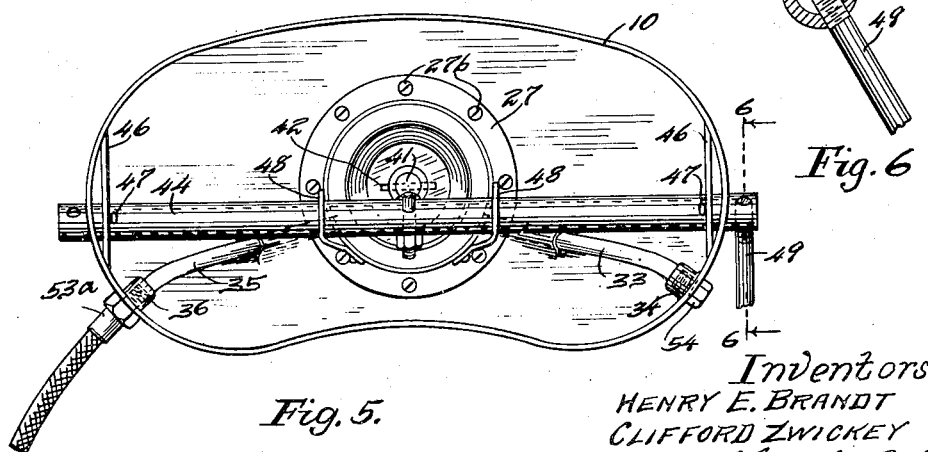
Fig. 5 is a bottom plan view of the sprayer, portions of the discharge tube and operating handle being broken away, and with the bottom cover removed.
Fig. 6 is a vertical section taken on line 6—6 of Fig. 5 as indicated by the arrows.

Referring to the drawings, a sprayer is shown comprising a casing 10. While this casing might be variously formed, in the embodiment of the invention illustrated it is shown as of general oblong or kidney shape in horizontal cross section, thus having a side somewhat concave adapted to be adjacent the back of the operator, and an opposite side which is somewhat convex. The top of said casing is shown as having an inturned bead 10a and a cover 11 is provided having an outer curved or trough-like portion 11a adapted to fit over bead 10a. Said cover is somewhat depressed just inwardly of said bead and has a slightly curved top at its central portion with its convex side upward. A bail handle 12 has end portions engaging the top of cover 11 and secured thereto by the rivets 13. Cover 11 has spaced lugs 14 secured to one side which are pivotally connected by links 15 to lugs 16 riveted to cover 10 so that said cover is thus hinged at one side to said casing. Cover 11 is held in closed position by a pair of spring clips or clasps 17 pivotally connected to lugs 18 secured to the rear side of casing 10 by rivets or other suitable fastening means. Members 17 are curved to fit over the edge of cover 11 and have terminal portions 17a forming finger holds. Handle 12 is perforated at spaced points along one side thereof to have attached thereto the snap hooks 19 which are secured to the ends of straps 20 respectively. Straps 20 have snap hooks 21 secured to their other ends and adapted to be connected to aperture lugs 22 secured to the front or concave side of casing 10. The straps 20 are arranged to extend over the shoulders and under the arms of the operator so that casing 10 can conveniently and comfortably be carried on the back of the operator as shown in Figs. 1 and 2. Said straps may, if desired, be equipped with length adjusting means (not shown). A plate or diaphragm 23 extends across casing 10 some distance from the bottom thereof, the same being shown as having an upturned flange secured against the inner side of said casing, and this may be secured by welding or any other suitable means. Plate 23 is disposed just above the upper one of two inwardly pressed groove-forming portions 10b in casing 10. A similar pair of grooves 10d is formed adjacent the top of casing 10. Plate 23 forms the bottom of a tank which is formed in casing 10 above said plate. A container 25 shown as of cylindrical form and having a closed upper end is secured at its bottom in an aperture formed in plate 23 substantially centrally thereof. A plate 26 of general circular form has a round cylindrical portion 26a fitting in and secured in the bottom of container 25, said plate also having a peripheral horizontal flange 26b. Another plate 27 of short cylindrical form has a peripheral flange 27a mating with flange 26b and a flexible diaphragm 28 of leather, rubber or similar sheet material is clamped at its edge between said flanges, which flanges are connected by screws 27b. Portion 26a of plate 26 has an upstanding cylindrical portion 26c with an aperture 26d in the top thereof. A plug 29 is threaded into portion 26c from the bottom thereof, the same having a central aperture therethrough and being formed with a concave recess at the upper end thereof about said aperture, thus forming a valve seat for a ball 30 arranged to form a check valve. Another plug 31 is threaded into plates 23 and 26 at one side of the container 25, which plug has a top aperture or passage 31a extending to a chamber or enlarged passage 31b therein from which lead passages 31c into the space between plate 26 and diaphragm 28. A ball 32 is disposed loosely in chamber 31b and plug 31 is formed with a concave recess at its top to form a valve seat for said ball. A tube 33 is connected at one end to container 25 to communicate with the interior thereof and said tube extends outwardly and downwardly through plate 23 to an outlet member 34 secured in the side of casing 10. Another similar tube 35 is connected to container 25 to communicate with the interior thereof and this tube extends outwardly and downwardly through plate 23 and is connected to an outlet connection 36 secured in the side of casing 10 substantially oppositely across said casing from connection 34. A rod 37 has a reduced threaded portion extending centrally through diaphragm 28 and receives a nut 38 engaging a washer 39 disposed against diaphragm 28. A shallow cup-shaped circular plate 40 has a central semi-spherical portion engaging the bottom of diaphragm 28 and is engaged by the enlarged portion of rod 37 so that diaphragm 28 is clamped between members 39 and 40. Rod 37 has an enlarged portion at its lower end having a cylindrical chamber therein with a semi-spherical upper end. A plug 41 is secured in the lower end of rod 37 by the pin 42, said plug having a semi-spherical recess in its upper end. A ball 43a formed on the end of a rod or bolt 43 is disposed between the upper end of plug 41 and the end of the chamber in rod 37 so that said parts form a ball and socket or universal joint. Rod 43 extends diametrically through a shaft 44 illustrated as a tube and said rod is threaded at its ends to receive a nut 45 holding it in place in shaft 44. Shaft 44 extends entirely across casing 10 throughout the long dimension thereof and projects some distance at each side of said casing.

Shaft 44 is journalled in the wall of casing 10 and also in the plates 46 extending transversely within casing 10 adjacent the end thereof and secured to said casing by a welding or other suitable means. Split keys 47 extend through shaft 44 at the inner sides of plates 46 respectively and prevent endwise movement of the shaft 44. A pair of plates 48 are riveted to plate 27 and project downwardly therefrom also forming bearings for shaft 44 which passes therethrough. Shaft 44 has threaded holes extending diametrically therethrough adjacent each end outside of casing 10 and a handle member 49 shown as formed of a rod has a threaded portion 49a adapted to be screwed into either one of said holes. Rods 49 have enlarged grip portions 49b at their ends opposite portions 49a.

A spray or discharge means is provided comprising a nozzle assembly which may be of any well known construction for projecting a diverging spray. Nozzle 50 is secured to a rigid tube 51 which is in turn secured to a control valve. Control valve 52 has a spring pressed handle 52a adapted to be gripped by the operator. When handle 52a is in released position the flow of the liquid is shut off and when handle 52a is gripped and moved the flow or discharge of liquid is permitted. Valve 52 is connected by a flexible hose or conduit 53 to one of the discharge connections 34 or 36. Conduit 53 has an end connection 53a having a threaded portion which can be screwed into either of the outlet members 34. The outlet member 34 which is not in use will be closed by a suitable plug 54. It is desirable at times to carry the sprayer without the necessity of carrying tube 51 and a holding means is accordingly provided for this member on the tank or casing 10. Casing 10 is provided with an inwardly pressed groove forming portion 10c and a resilient clip 55 is secured to casing 10 below the groove formed by portion 10c, said clip being secured by the rivets 56. Clip 55 is of considerable width as shown in Figs. 1 and 2, and is provided with a curved portion 55a having a concave horizontally extending portion disposed opposite the groove in portion 10c. Clip 55 has an upwardly and outwardly extending central terminal portion 55b which facilitates the insertion of tube 51. The construction and location of the holding means including clip 55 is such that the operator can grasp tube 51 and conveniently place it in the holding means while the casing 10 is carried on his back. Tube 51 can likewise be readily removed by the operator while the casing is carried on his back.

A vertical partition 57 extends across casing 10 adjacent its middle portion and a short distance from the top thereof. A screen 58 extends across said casing between the sides thereof and between partition 57 and one end of the casing. A bottom closure plate 60 is provided having a flange 60a extending around the lower end of casing 10 and secured thereon by the screws 61.

In operation, when the sprayer is to be used, the clips 17 will be swung out of engagement with cover 11 and said cover swung open on its hinges. The liquid to be sprayed will be poured into the tank above plate 23 by being placed in the compartment formed by partition 57 and which has the screen bottom 58. The liquid will thus be strained while being placed in the tank. The liquid will flow through passage 31a into the chamber 31b and will flow into the space between plate 26 and diaphragm 28 when the latter is in its lower position. Ball 32 does not close the passages 31c. The casing 10 will be placed in the position on the back of the operator as shown in Figs. 1 and 2 and supported thereon by straps 20. The handle 49 will be placed in the desired end of shaft 44 and will then be in position to be oscillated by one hand of the operator. The connection 53a will be attached to the outlet 34 at the opposite side of the casing. The operator can now grasp the valve member 52 with his other hand as shown in Fig. 1. It will be noted that handle 49 can be attached to either end of the shaft 44 and that tube 53 can be attached to either side of the casing. The tubes can thus be changed so that the operator can use either hand for operating the pump mechanism. It may be that when the sprayer is being used for long periods the operator may want to change hands on the operation and the facility for placing the handle at either side renders the device suitable for either a right handed or left handed operator. With the device in position, the operator oscillates handle 49 and this reciprocates the diaphragm 28. When shaft 44 is oscillated, member 43 is raised and lowered and this oscillates rod 37 through the connection of the rod 43 therewith. Rod 37 is thus raised and lowered and diaphragm 28 is thus raised and lowered. When diaphragm 28 is raised the liquid which has filled the space between the same and plate 26 is forced through plug 29 and aperture 26d into container 25. At this time ball 30 is lifted by the liquid and ball 32 is also lifted and moved against the seat at the top of chamber 31b so as to close passage 31a. Balls 30 and 32 thus form oppositely acting check valves. Liquid is thus pumped from the tank to the container 25, which container will always have in its upper end a certain amount of air. The liquid is thus placed under pressure in container 25 and flows out through either tube 33 or 35 to the outlet 34 or 36 with which conduit 53 is connected. When the operator operates handle 52a the fluid is forced through the nozzle 50 and sprayed therefrom. The operator can direct the spray on to the plants as desired by manipulating the rod 51. As above stated, the operator may place tube 51 in the holder 55 when desired and this can be done conveniently while casing 10 is carried on the back of the operator. Plate 60 can readily be removed by removing the screws 61 to give access to the pump and its operating parts. The pump and said parts are protected from dirt and injury by plate 60.

From the above description it is seen that applicant has provided a simple and very convenient spraying device and one having many desirable features. The same has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claim.

What is claimed is:

A sprayer structure having in combination, a tank adapted to be carried on the body of the operator, a nozzle equipped discharge tube, flexible means connecting said tube and tank and a holder for said tube comprising an upwardly directed resilient clip secured centrally to the rear side of said tank and spaced therefrom so that said tube may be resiliently held between said clip and tank, said tank having an inwardly extending groove formed therein and extending horizontally opposite said clip.

HENRY E. BRANDT.
CLIFFORD ZWICKEY.